UNITED STATES PATENT OFFICE.

GAIL MERSEREAU, OF NEW YORK, N. Y., ASSIGNOR TO CHEMICAL DEVELOPMENT COMPANY, OF NEW YORK, N. Y., A CORPORATION OF MAINE.

CELLULOSE SOLVENT.

1,308,803. Specification of Letters Patent. Patented July 8, 1919.

No Drawing. Application filed September 10, 1913, Serial No. 789,221. Renewed January 2, 1918. Serial No. 210,074.

*To all whom it may concern:*

Be it known that I, GAIL MERSEREAU, a citizen of the United States, and resident of New York, in the county of New York and State of New York, have invented certain new and useful Improvements in Cellulose Solvents, of which the following is a specification.

My invention relates to cellulose solvents and the compositions obtained by their use.

It has long been known that esters of cellulose such as acetyl and nitro cellulose were soluble in certain mixtures of which the individual constituents were nonsolvents of said esters. It has been found a great handicap in using such solutions to have to use either solids such as camphor which remained in the solute when the other solvent volatilized, or to have to use an extremely volatile admixture such as ether. In other words the great desideratum has been a solvent of medium volatility. I have found that certain of the cellulose esters such as certain acetates in particular will readily dissolve in the more or less complex chlorin compound containing heavy oil formed when petroleum oils are pyrolized and the gaseous product is then treated with chlorin to form largely addition products, provided such heavy oil is mixed with a little alcohol or suitable cosolvent. Such a heavy oil is the product of a process disclosed in my application executed of even date herewith, and of which the specification Serial #790,080½ was filed on even date herewith. In said application I have shown how the gases produced by pyrolizing petroleum at a temperature of 700° C. in a narrow tube may be treated with chlorin in the dark in the intimate presence of a cooling medium, such as water, to produce almost exclusively addition products which form this heavy oil. I have found that such cellulose esters are dissolved even more readily by the fraction of my heavy oil which boils between 125° and 150° C. This fraction appears to consist of a complex mixture of several compounds not separable by any known method of treatment. This fraction, therefore, while separable into fractions having various boiling points, is quantitatively speaking unanalyzable.

For example said fraction when mixed with 25% of ethyl alcohol by weight will dissolve certain cellulose acetates very readily.

My heavy oil as it comes from the reaction apparatus producing it may be mixed with two and a half parts by volume of methyl alcohol. This forms an excellent solvent for acetyl cellulose. A larger proportion of my chlorin compound containing heavy oil decreases the solvent action of the mixture. Ethyl alcohol will give about the same result, and a larger proportion of alcohol will decrease the solvent action of the mixture.

I have also found that a mixture of equal parts of my heavy oil and ethyl alcohol forms an excellent solvent for acetyl cellulose.

The fractions of my heavy oil boiling below 120° C. give about the same result as the unfractionated heavy oil. For example, I have found that the fraction of my heavy oil boiling between 110° and 120° C. can be used as a substitute for the ordinary more volatile liquids for mixing with alcohol to produce a solvent for such cellulose esters as nitro cellulose.

It will be noted that my heavy oil and any of its fractions fail to mix easily with water and so they form the much desired nonhygroscopic substance, to mix with alcohol in making cellulose solution.

While I have described certain detailed uses of my heavy oil, it should be noted that I have done so merely to show those skilled in the art some of the advantages of my invention, but what I claim as my invention is:

1. A composition of matter comprising the herein described mixture of compounds of chlorin, carbon and hydrogen which forms a heavy oil of which a large part is inseparable into its component compounds by methods now known, a certain group of the more volatile of said compounds being the equivalent in volatility of the standard volatile solvents of nitro cellulose, said composition also comprising an alcohol and cellulose ester.

2. A composition of matter comprising a cellulose ester, and a complex liquid resulting from adding inorganic acid radicals to the mixture of unsaturated hydrocarbons contained in oil gas.

3. A composition of matter, comprising a cellulose ester and a complex liquid resulting from adding chlorin in the dark to the mixture of unsaturated hydrocarbons contained in oil gas.

4. A composition of matter comprising a complex fraction of a chlorin-containing-compound heavy oil of which a large part is inseparable into its component compounds by methods now known, said fraction being substantially non-hygroscopic, said composition also including an alcohol, and a cellulose ester.

5. A composition of matter comprising a substantially non-hygroscopic complex mixture of chlorin-containing-compounds of carbon and hydrogen having a maximum boiling point not much exceeding 150° C., a cellulose ester, and an alcohol like body miscible with said chlorin containing compounds to dissolve said ester.

GAIL MERSEREAU.

Witnesses:
TITUS H. IRONS,
F. E. ALEXANDER.